United States Patent
Jannin et al.

(10) Patent No.: US 9,903,973 B2
(45) Date of Patent: Feb. 27, 2018

(54) SYSTEMS AND METHODS FOR REMOVING COHERENT NOISE IN LOG DATA

(71) Applicant: Schlumberger Technology Corporation, Sugar land, TX (US)

(72) Inventors: Gaelle Jannin, Houston, TX (US); Andrew J. Hayman, Voisins-le-Bretonneux (FR); Thomas Barrou, Cachan (FR); Sylvain Thierry, Le Mesnil St Denis (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 575 days.

(21) Appl. No.: 14/566,638

(22) Filed: Dec. 10, 2014

(65) Prior Publication Data
US 2015/0177405 A1 Jun. 25, 2015

(30) Foreign Application Priority Data
Dec. 23, 2013 (EP) ..................... 13306856

(51) Int. Cl.
*G01V 1/46* (2006.01)
*G01V 1/48* (2006.01)

(52) U.S. Cl.
CPC ............. *G01V 1/46* (2013.01); *G01V 1/48* (2013.01); *G01V 2210/324* (2013.01)

(58) Field of Classification Search
CPC ....... G01V 1/46; G01V 1/48; G01V 2210/324
USPC ............................................. 702/6, 35, 88
See application file for complete search history.

(56) References Cited

U.S. PATENT DOCUMENTS

| | | |
|---|---|---|
| 4,382,290 A | 5/1983 | Havira |
| 2010/0265796 A1 | 10/2010 | Steinsiek et al. |
| 2011/0222368 A1 | 9/2011 | Fussell |

*Primary Examiner* — Bo Fan
(74) *Attorney, Agent, or Firm* — Michael Dae

(57) ABSTRACT

Methods and devices for obtaining well log data with reduced coherent noise are provided. One such method may include placing a downhole tool into a well to obtain a set of unfiltered well log data that includes individual measurements obtained at various azimuthal angles within the well. Some of the unfiltered well log data may represent eccentered well log data obtained while the downhole tool is eccentered in the well. The individual measurements of the eccentered well log data may have delays that vary as a function of the azimuthal angle at which they were obtained. By comparing the measurements of the eccentered well log data, a common pattern independent of delay, representing coherent noise, may be identified. The common pattern may be subtracted from the well log data to produce filtered well log data that is less noisy than the unfiltered well log data.

20 Claims, 13 Drawing Sheets

SYSTEMS AND METHODS FOR REMOVING COHERENT NOISE IN LOG DATA

BACKGROUND

This disclosure relates to improving the quality of well log data by removing coherent noise.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

When a well is drilled into a geological formation, logging tools are used to determine a variety of characteristics of the well. Some logging tools may determine characteristics of the surrounding rock formation and some logging tools may determine when cement has been properly installed in the well to achieve zonal isolation. In the example of cement evaluation, a wellbore may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." Yet well completions may not go as planned. For example, the cement may not set as planned and/or the quality of the cement may be less than expected. In other cases, the cement may unexpectedly fail to set above a certain depth due to natural fissures in the formation.

A variety of acoustic tools may be used to verify that the cement is properly installed. These acoustic tools may use pulse acoustic waves as they are moved through the wellbore to obtain acoustic cement evaluation data at various depths and azimuths in the wellbore. The acoustic cement evaluation data may include not just the signal relating to the quality of the cement, however, but also noise caused by the electronic circuitry of the tool and other sources. Recent developments in well drilling and completion may reduce the strength of the detected signal and/or may benefit from higher precision. Wells are increasingly drilled using heavier drilling fluids and thicker casings, for example, which may attenuate acoustic signals more than lighter drilling fluids and thinner casings. In addition, well casings are increasingly being installed using lighter cements that have acoustic properties more similar to fluids than heavier cements. These lighter cements may be difficult to detect without finer precision. Accordingly, improving the signal-to-noise ratio (SNR) of acoustic downhole tools may enable more accurate and/or precise determinations of cement installation quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to methods and devices to obtain well log data, such as acoustic well log data, having reduced coherent noise. In a first example, a method may include placing a downhole tool into a well to obtain a set of unfiltered well log data that includes individual measurements obtained at various azimuthal angles within the well. Some of the unfiltered well log data may represent eccentered well log data obtained while the downhole tool is eccentered in the well. The individual measurements of the eccentered well log data may have delays that vary as a function of the azimuthal angle at which they were obtained. By comparing the measurements of the eccentered well log data, a common pattern independent of delay, representing coherent noise, may be identified. The common pattern may be subtracted from the well log data to produce filtered well log data that is less noisy than the unfiltered well log data.

In another example, a non-transitory, computer-readable medium may include instructions executable by a processor to receive well log data that includes acoustic waveforms obtained at various azimuthal angles by an acoustic downhole tool. A first subset of the well log data may include acoustic waveform delay characteristics indicative of having been obtained while the downhole tool was eccentered in the well. The instructions may also identify a common pattern in at least a second subset within the first subset of the well log data that is substantially independent of delays of the acoustic waveforms of the second subset. The instructions may subtract the common pattern from at least one of the plurality of acoustic waveforms of the well log data to obtain a filtered acoustic waveform that has less coherent noise.

In another example, a downhole tool may include a rotating measurement component and a centralizer. The rotating measurement component may rotate to obtain measurements at various azimuthal angles in a well. The centralizer may eccenter—rather than center—the downhole tool in the well while the rotating measurement component rotates to obtain the measurements.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
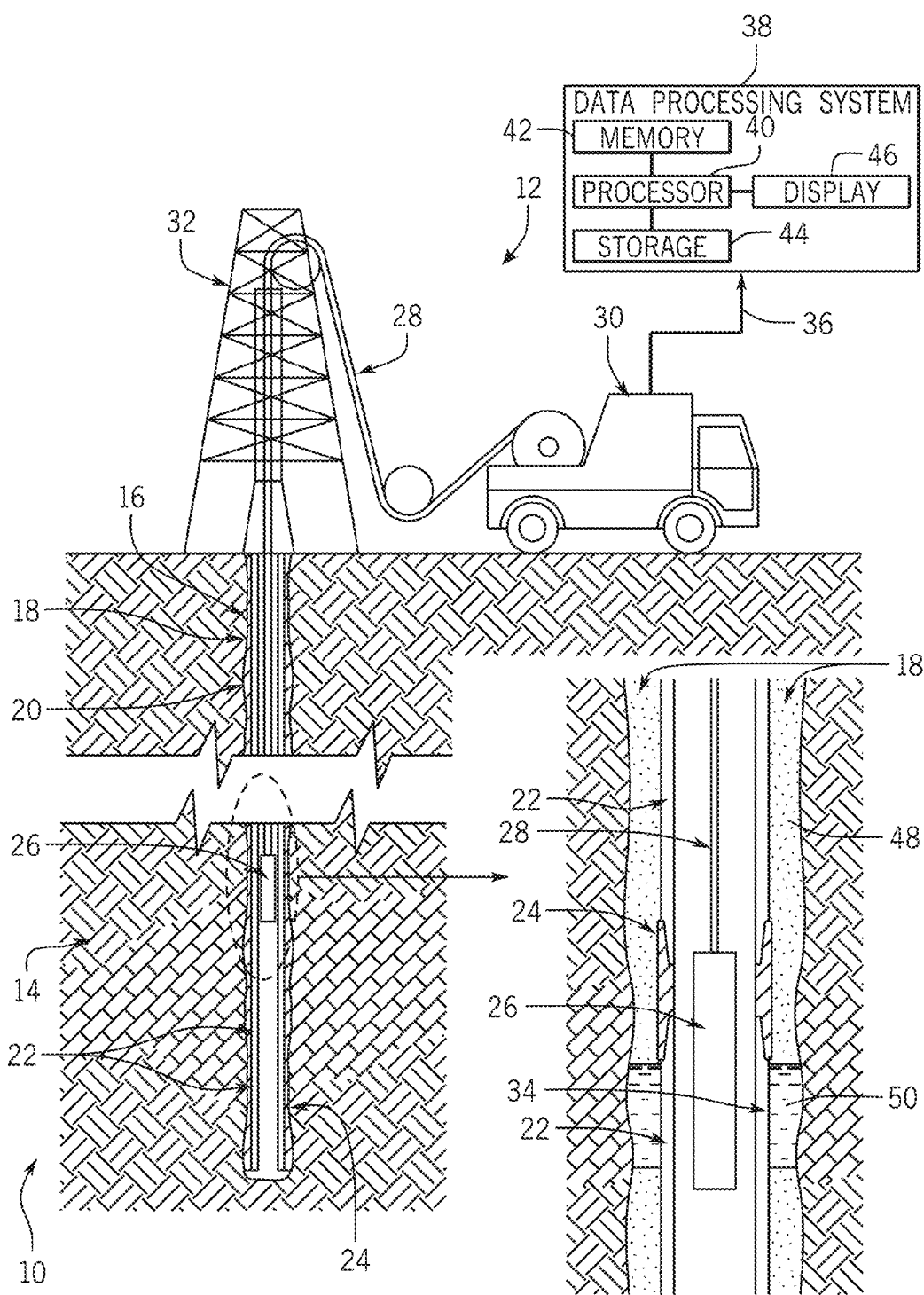
FIG. 1 is a schematic diagram of a system for obtaining well logging data with reduced coherent noise, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool is moved through the well to obtain certain physical measurements. By processing these physical measurements, the characteristics of the well may be estimated. In the case of cement evaluation, for example, an acoustic logging tool may emit pulses of acoustic energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain whether the material on the other side of the casing is a solid, and therefore likely to be properly installed cement. Other downhole tools may ascertain other well characteristics by, for example, emitting electromagnetic signals or radiation and detecting signals that return.

As mentioned above, recent developments in well drilling, such as heavier drilling fluids and lighter cement, may reduce the ability of acoustic logging tools to effectively determine cement quality. To account for these developments, the operating frequency of acoustic logging tools may be reduced, but doing so may introduce additional noise due to tool electronics and intrinsic noise of the acoustic transducers of the acoustic logging tools. Indeed, it is believed that the electronic circuitry of these tools may also produce a noise background that may be detected in the return signals. When an acoustic pulse is emitted and a return signal detected by a transducer and converted into an electrical signal for processing, the electronic circuitry of the tool may introduce noise into the electrical representation of the return signal. This noise may be coherent—that is, the noise may consistently tend to occur at the same points in time in relation to some starting point (e.g., from the initial generation of the acoustic pulse), even though the individual return signals may have different delays. This disclosure will focus on removing such coherent noise from downhole logging data by identifying a common pattern independent of the delay of the return signals.

Before continuing, it should be noted that this disclosure describes, by way of example, removing coherent noise from acoustic logging data. It should be appreciated, however, that the waveform stacking techniques of this disclosure may be used to remove coherent noise from any suitable sets of logging data from any suitable downhole logging tool, provided the tools measure returning signals in the form of waveforms received over time with delays that vary depending on standoff from the casings. This disclosure will describe using sets of data from an eccentered tool—a tool that is off-center in the well—to separate the signals from coherent, repeating noise. When the logging tool is eccentered in the borehole, whether by design or by chance, measurements made by the tool as the tool rotates will take place at different standoffs (i.e., distances from the edge of the casing). As the tool rotates to take various measurements around the inside of the casing, the off-center tool will make some measurements closer to the edge of the casing and other measurements farther from the edge of the casing. Thus, an emitted pulse and returning signal may travel a different distance at a first azimuth than at a second azimuth. This, in turn, results in detected return waveforms having varying amounts of delay depending on the azimuth of measurement in the borehole. Coherent noise, however, may tend to occur at the same points in time regardless of the individual signal delays due to the eccentering of the tool. This coherent noise may be identified as a common pattern in eccentered well log data that consistently occurs at the same time from the initial acoustic pulse and substantially independent of the various delays in the actual return signals. By stacking the various return waveforms obtained over some interval (e.g., over 360° of azimuthal measurements in the borehole), a resulting stacked waveform representing the coherent noise may be identified. The stacked waveform may be subtracted from the detected signals to obtain corrected signals that may provide an improved logging measurement.

With this in mind, FIG. 1 schematically illustrates a system 10 for removing coherent noise in logging data obtained by an eccentered downhole tool (e.g., an acoustic logging tool). In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager (USI) tool and/or an Isolation Scanner (IS) tool by Schlumberger Technology Corporation. The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the flexural mode (e.g., in the manner of an imaging-behind-casing (IBC) tool). These measurements may be used as acoustic cement evaluation data to identify likely locations where solid, liquid, or gas is located in the annulus 20 behind the casing 22.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measures of acoustic impedance and/or flexural attenuation, which may be used to determine where the material behind the casing 22 is a solid (e.g., properly set cement) or is not solid (e.g., is a liquid or a gas). When the acoustic logging tool 26 provides such measurements to the surface equipment 12 (e.g., through the cable 28), the surface equipment 12 may pass the measurements as acoustic cement evaluation data 36 to a data processing system 38 that includes a processor 40, memory 42, storage 44, and/or a display 46. In other examples, the acoustic cement evaluation data 36 may be processed by a similar data processing system 38 at any other suitable location. The data processing system 38 may collect the acoustic cement evaluation data 36 and, by stacking at least a subset of the acoustic cement evaluation data 36 obtained while the acoustic logging tool 26 is eccentered in the wellbore 16, may remove coherent noise. After removing the coherent noise, the data processing system 38 may determine whether such data 36 represents a solid, liquid, or gas using any suitable processing (e.g., $T^3$ processing, *Traitement Très Tôt*, or Very Early Processing). One example of this processing technique is described in U.S. Pat. No. 5,216,638, "Method and Apparatus for the Acoustic Investigation of a Casing Cemented in a Borehole," which is assigned to Schlumberger Technology Corporation and is incorporated by reference herein in its entirety for all purposes. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the indicate the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36 to remove coherent noise, ascertaining the character of the annular fill 18 may be more accurate and/or precise than comparable processing when the coherent noise remains in the acoustic cement evaluation data 36.

Figure 2:
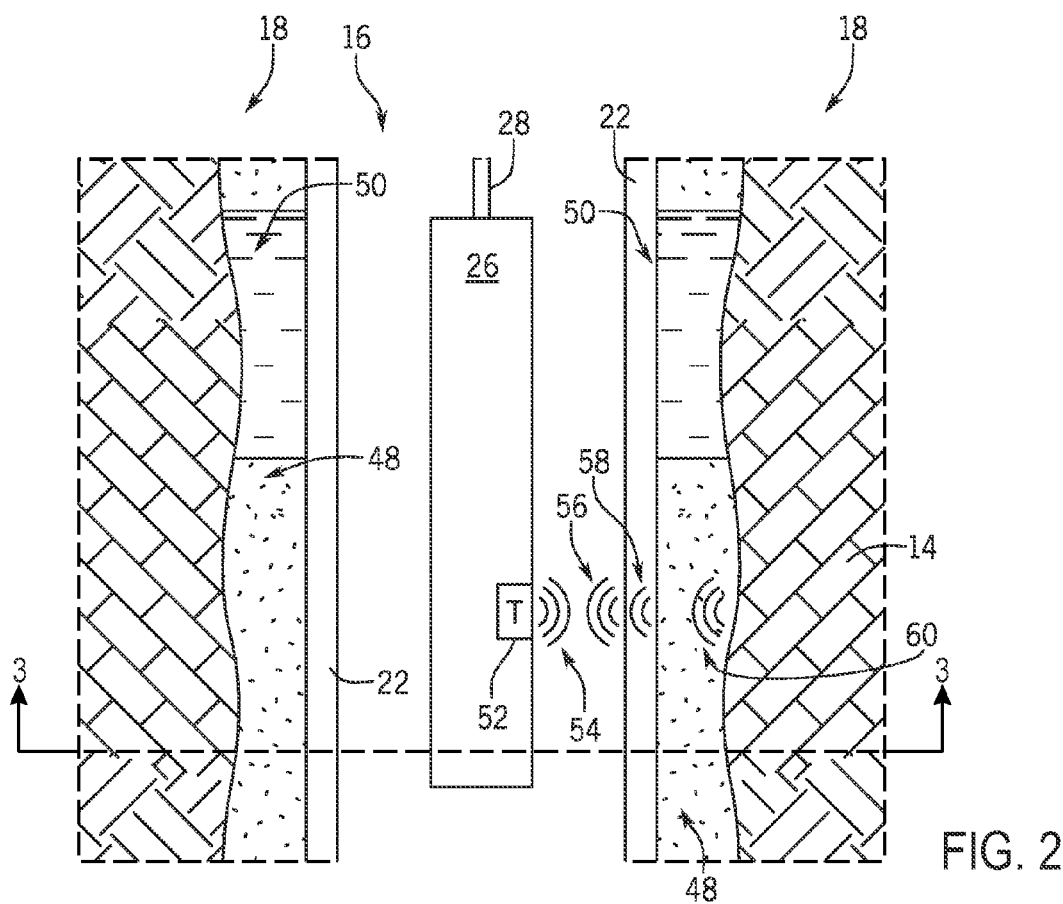
FIG. 2 is a block diagram of an acoustic downhole tool that may be used to obtain the well logging data, in accordance with an embodiment.

With this in mind, FIG. 2 provides an example of the operation of the acoustic logging tool 26 in the wellbore 16. Specifically, a transducer 54 in the acoustic logging tool 26 may emit acoustic waves 54 out toward the casing 22. Reflected waves 56, 58, and 60 may correspond to acoustic interactions with the casing 22, the annular fill 18, and/or the geological formation 14 or an outer casing. The reflected waves 56, 58, and 60 may vary depending on whether the annular fill 18 is of the generally solid character 48 or the generally liquid or gas character 50. The acoustic logging tool 26 may use any suitable number of different techniques, including measurements of acoustic impedance from ultrasonic waves and/or flexural attenuation, to name a few.

Figure 3:
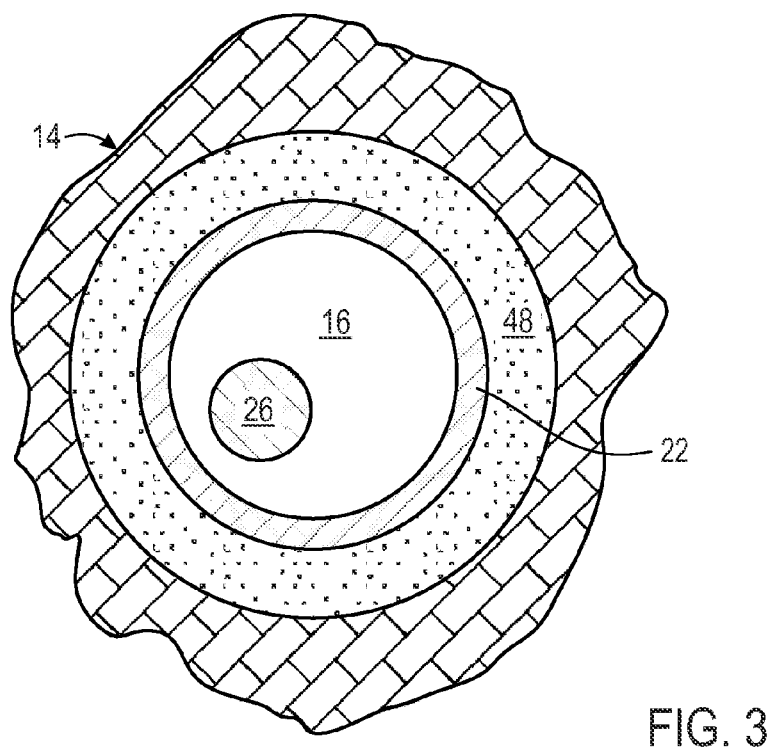
FIG. 3 is a cross-sectional view showing an eccentered placement of the acoustic logging tool of FIG. 2, in accordance with an embodiment.

As noted above, the acoustic logging tool 26 may be eccentered in the wellbore 16. FIG. 3 is a cross-sectional view of the position of the acoustic logging tool 26 of FIG. 2 at cut lines 3-3. As seen in FIG. 3, the acoustic logging tool 26 is not fully centered in the wellbore 16. As will be discussed below, the eccentering of the acoustic logging tool 26 may be deliberate or by chance. An example of an acoustic logging tool 26 that is deliberately eccentered will be discussed below with reference to FIGS. 18 and 19. Still considering FIG. 3, when the acoustic logging tool 26 obtains acoustic measurements at various azimuths by emitting the acoustic pulse 54 against the casing 22, the return waveforms 56, 58, and/or 60 may arrive with varying amounts of delay because the signals may travel correspondingly varying distances. The varying delays may allow coherent noise to be identified and removed according to the waveform stacking techniques of this disclosure.

As the acoustic logging tool is rotated through the wellbore 16, the acoustic logging tool 26 may obtain many individual measurements at various azimuths within the wellbore 16. In one example, the acoustic logging tool 26 may obtain 36 or 72 measurements over a 360° range of rotation, though any suitable number of measurements may be obtained while the acoustic logging tool 26 rotates. In certain examples, each of these measurements may take the form of a single waveform, such as the waveform shown by a plot 70 in FIG. 4. In the plot 70, an ordinate 72 represents amplitude in relation to an abscissa 74 representing time (μs). The waveform of the plot 70 includes a main echo portion 76 and a reverberation portion 78. The main echo portion 76 represents the initial reflection of the acoustic pulse against the casing 22. The reverberation portion 78 represents the subsequent reverberations of the casing 22 that have been induced by the acoustic pulse 54 emitted by the acoustic logging tool 26. The information contained in the waveform of the plot 70 may be used to determine a variety of parameters of the wellbore 16, including a thickness of the casing 22 and/or a quality of the annular fill 18.

The plot 70 may contain coherent noise, although the coherent noise may not become apparent until many individual waveforms obtained from various azimuths are considered and compared. As seen in a plot 90 of FIG. 5, for example, many acoustic waveforms may be obtained over a number of azimuthal cycles and depths within the wellbore 16. In particular, the plot 90 of FIG. 5 includes an ordinate 92 representing time in microseconds (μs) from the time that the waveforms are obtained, which includes the individual delay associated with each measurement. An abscissa 94 represents changes in the depth and azimuthal measurement direction of the acoustic logging tool 26. The depth and azimuthal measurements are considered together on the abscissa 94 because the acoustic logging tool 26 is being rotated while its depth is changing (e.g., in a corkscrew pattern through the wellbore 16). A legend 96 illustrates the relative amplitude of the acoustic waveforms (completely white representing a maximum amplitude and completely black representing a minimum amplitude). The amplitudes of the waveforms plotted in the plot 90 of FIG. 5 include both main echo portions 76 and reverberation portions 78 at each measurement depth/azimuth.

Figure 5:
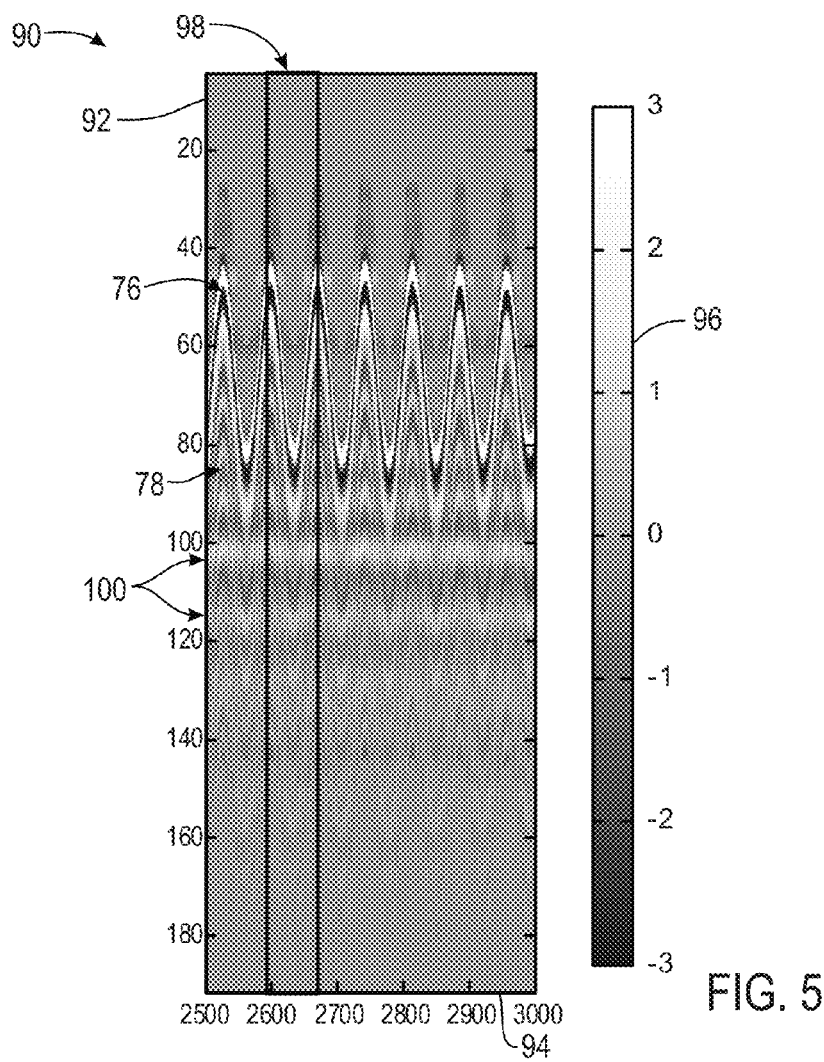
FIG. 5 is a plot of many acoustic waveforms obtained by the acoustic logging tool over a variety of depths and azimuths that includes coherent noise, in accordance with an embodiment.

As can be seen in the plot 90 of FIG. 5, the waveforms plotted over depth and azimuth take on a cyclical behavior due to a cyclical variation in waveform delay. A full cycle is shown, for example, in a depth segment 98. In the depth segment 98, 72 waveform measurements have been obtained over 360° of azimuthal measurements occurring over approximately 80 feet of depth within the wellbore 16. The cyclical nature of the plot 90 is due to the eccentered position of the acoustic logging tool 26 in the wellbore 16. As a result, some azimuthal measurements travel greater distances within the wellbore 16 to and from the casing 22 and, accordingly, have correspondingly greater delays.

Even though the return waveforms in the plot 90 have a generally cyclical nature corresponding to cycles of azimuthal measurements in the wellbore 16, certain amplitude changes appear to occur at fixed times. These consistent patterns of amplitude change represent coherent noise 100, which may manifest itself at the same points in time in relation to an initial starting point on the plot 90. It is believed that the coherent noise 100 is due to the behavior of certain electronic equipment in the acoustic logging tool 26. Regardless of the particular source of such coherent noise 100, however, the coherent noise 100 may be removed using waveform stacking as provided below.

Figure 6:
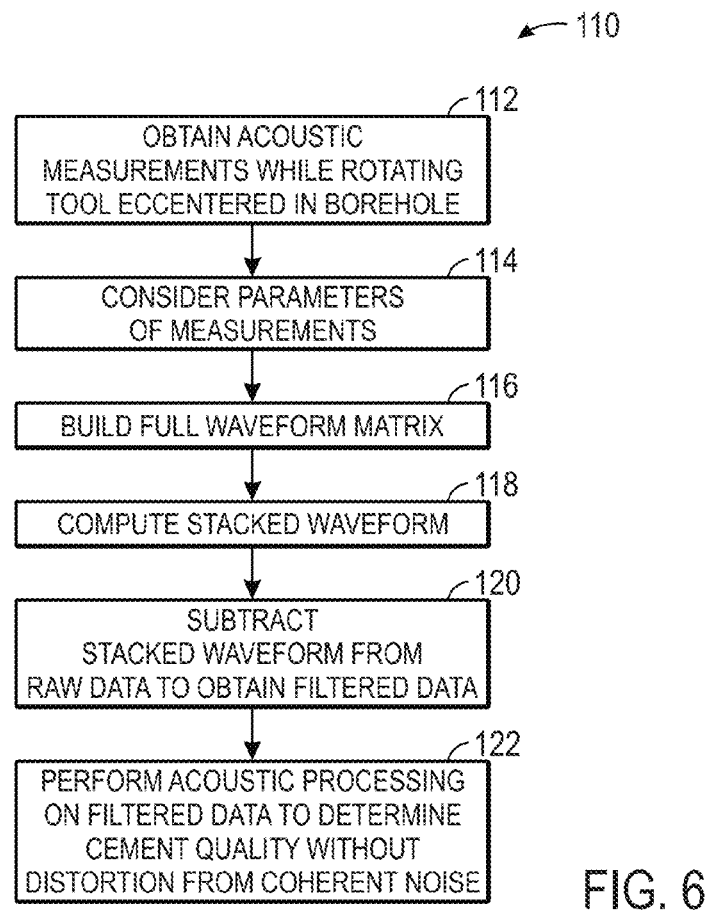
FIG. 6 is a flowchart of a method for removing the coherent noise from acoustic logging data using waveform stacking, in accordance with an embodiment.

For example, as shown by flowchart 110 of FIG. 6, the acoustic logging tool 26 may obtain a number of measurements in the wellbore 16 while eccentered (block 112). The acoustic logging tool 26 may be eccentered by design or by chance. In either case, the resulting acoustic cement evaluation data 36 (e.g., waveforms such as those discussed above) may include at least a subset of waveforms obtained while the acoustic logging tool 26 is eccentered, and therefore that can be used to separate the true return signals from coherent noise.

The data processing system 38 may use at least a subset of the acoustic cement evaluation data 36 to perform waveform stacking to identify coherent noise. To do so, the data processing system 38 may identify from the acoustic cement evaluation data 36 at least a subset of the data obtained while the acoustic logging tool 26 is eccentered in the wellbore 16. This subset of data may include, for example, one complete cycle of measurements over 360° of azimuthal rotation (e.g., from a segment such as the depth segment 98), or at least enough of such a cycle to isolate the coherent noise from the acoustic cement evaluation data 36. For instance, a set of peak-to-trough or trough-to-peak measurements may suffice to enable coherent noise to be separated from the actual return signals. The data processing system 38 may identify the subset of acoustic cement evaluation data using any suitable technique. In one example, an operator may specifically identify a depth segment where measurements were obtained while the acoustic logging tool 26 was known to be eccentered in the wellbore 16. In another example, the data processing system 38 may evaluate the delays of the various waveforms of the acoustic cement evaluation data 36 for a cyclical pattern that indicates that the acoustic logging tool 26 was eccentered in the wellbore 16, whether by design or by chance. If the acoustic cement evaluation data 36 does not any segment obtained while the acoustic logging tool 26 was eccentered in the wellbore 16, the waveforms of the acoustic cement evaluation data 36 may have the same delay, and thus may not be separated from the coherent noise using the waveform stacking technique of this disclosure.

In certain examples, the subset of the acoustic cement evaluation data 36 may be determined as a sliding window over the acoustic cement evaluation data 36 for a particular measurement point or sets of points. For example, a multiple of 360° measurement cycles (e.g., 1, 2, 3, or more cycles) surrounding a particular measurement point may be used to isolate the likely coherent noise in that measurement point. When a particular measurement point is considered as the center point in a 360° cycle (or multiples of 360° cycles) of acoustic cement evaluation data 36, coherent noise that is isolated in that subset of the data may represent the coherent noise most likely to be present in the waveform of that measurement point (as opposed, for example, to a subset of data from another segment of the data that does not include the measurement point. A sliding window may account for changes in the amount of coherent noise over time that may be caused by changes in temperature or other operating parameters as the acoustic logging tool 26 is moved through the wellbore 16. Additionally or alternatively to considering as a sliding window particular 360° cycles of the acoustic cement evaluation data 36, specific depths windows may be considered. These may be, for example, sliding windows of 100 ft to 500 ft, or more. In some examples, a single window that includes the entirety of the acoustic cement evaluation data 36 may be used as the subset for identifying coherent noise.

In some embodiments, acoustic cement evaluation data 36 obtained while the acoustic logging tool 26 is eccentered by a particular distance from the center of the wellbore 16 may be used to identify the coherent noise 100. In one example, data in which the following relationship is satisfied may used in the subset of data to identify coherent noise 100:

$$dt > T,$$

where T represents a period of casing resonance and dt represents a difference between the maximum echo arrival time (maximum delay) and the minimum echo arrival time (minimum delay). The variable dt may be described according to the following relationship:

$$dt = 4 * \frac{ecc}{Vmud},$$

where ecc represents an eccentering distance and Vmud represents an acoustic velocity in the well fluid. The variable T may be described according to the following relationship:

$$T \approx 2 * \frac{C_t}{Vsteel},$$

where $c_t$ represents a thickness of the casing 22 and $V_{steel}$ represents acoustic velocity in steel (used when the casing 22 is made of steel). For a casing thickness of 12 mm in a well fluid with velocity 1500 m/s, T may be approximately 4 μs, and thus dt may be greater than 4 μs. As a result, the acoustic logging tool 26 may be eccentered more than 1.5 mm. In certain embodiments, selecting data that has the proper characteristics may be done on a depth-by-depth basis.

The data processing system 38 may use the selected subset of the acoustic cement evaluation data 36 to isolate coherent noise through waveform stacking, which is described by blocks 114, 116, and 118 of the flowchart 110 of FIG. 6. To begin, the data processing system 38 may consider a variety of parameters of the waveform measurements of the acoustic cement evaluation data 36 (block 114). These parameters may include, for example, the particular waveform delay (e.g., in μs), which varies by azimuth depending on the distance of the acoustic logging tool 26 from the edges of the casing 22; the waveform array (time, azimuth, and depth) after correction for gain and normalization in relation to the initial pulse (e.g., 100V initial electrical excitation pulse amplitude); the known or estimated impedance (e.g., in units of MRayl) of the drilling fluid; the thickness and diameter of the casing 22; and/or the sampling frequency. It should be appreciated that the list of parameters above is provided by way of example and is not intended to be exhaustive. Indeed, more or fewer parameters may be considered to identify coherent noise through waveform stacking.

Using the parameters of the acoustic cement evaluation data 36, the data processing system 38 may build a waveform matrix (block 116). The waveform matrix may order the waveforms of the acoustic cement evaluation data 36 by azimuth and/or depth. For instance, columns of the matrix may represent a particular azimuth and depth in which the waveforms were obtained. The waveforms may be stored in the matrix as a function of their delay. It may be appreciated that the plot 90 of FIG. 5 may represent an example visualization of the waveform matrix.

The data processing system 38 may use the waveform matrix to compute a stacked waveform representative of the coherent noise of the acoustic logging tool 26 in the selected subset of the acoustic cement evaluation data 36 (block 118). After muting (e.g., removing) the main echo portion 76 of each waveform, the data processing system may stack the waveforms to identify repeating patterns that are not a function of waveform delay, and thus are likely to represent coherent noise. The data processing system 38 may perform this waveform stacking by performing a mean over the columns of the full waveform matrix. The resulting stacked waveform may substantially represent the coherent noise of that subset of the acoustic cement evaluation data 36.

As such, the data processing system 38 may subtract the stacked waveform from the original waveforms of the acoustic cement evaluation data 36 (block 120). The data processing system 38 may subtract the stacked waveform from the waveforms of the acoustic cement evaluation data 36 while the waveforms take the form as placed in the waveform matrix—that is, offset by their respective delays—and then returned to their original, non-delay-offset form after this correction to create waveforms filtered of coherent noise. It should be appreciated that the data processing system 38 may subtract the stacked waveform in either the time domain or the frequency domain. The data processing circuitry 38 may process these filtered waveforms to determine cement quality with reduced distortion due to coherent noise (block 122). The data processing circuitry 38 may use any suitable processing technique, including the $T^3$ technique discussed above.

Figure 15:
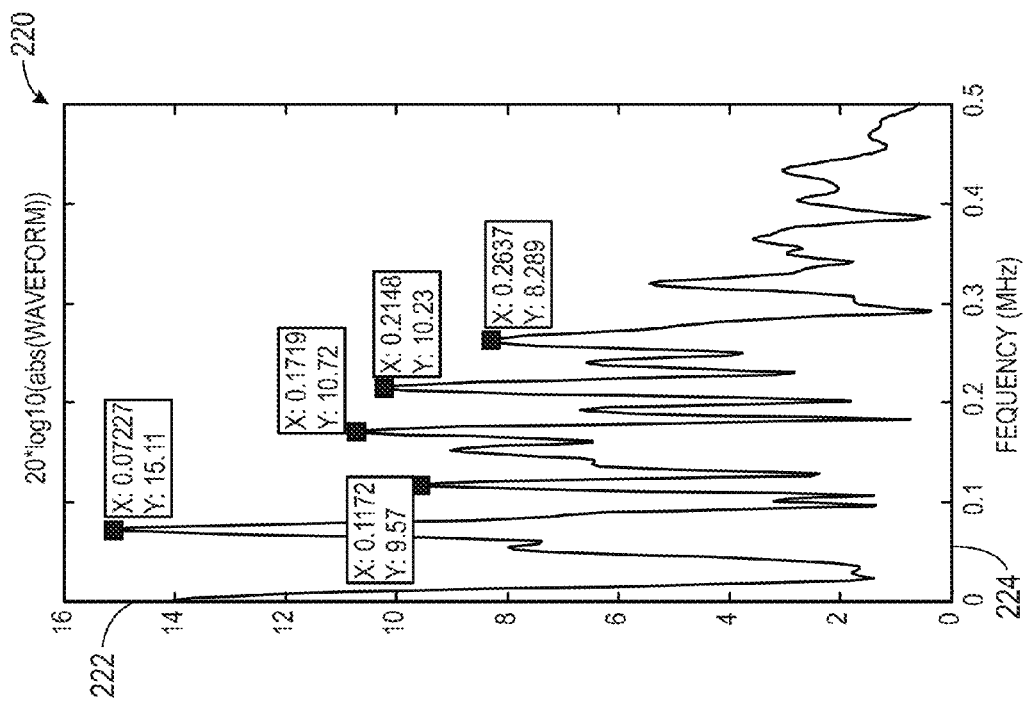
FIG. 15 is a plot of the stacked waveform of FIG. 14 after transformation into the frequency domain, in accordance with an embodiment.

Certain examples of the approach discussed in the flowchart 110 of FIG. 6 will be provided below. A discussion relating to FIGS. 7-10 will describe applying the waveform stacking approach of FIG. 6 to a single waveform. A discussion relating to FIGS. 11-13 will describe applying the waveform stacking approach of FIG. 6 to one 360° cycle of measurements at a single depth. A discussion relating to FIGS. 14-16 will describe applying the waveform stacking approach of FIG. 6 to acoustic cement evaluation data 36 obtained at a variety of depths and azimuthal measurements.

Figure 4:
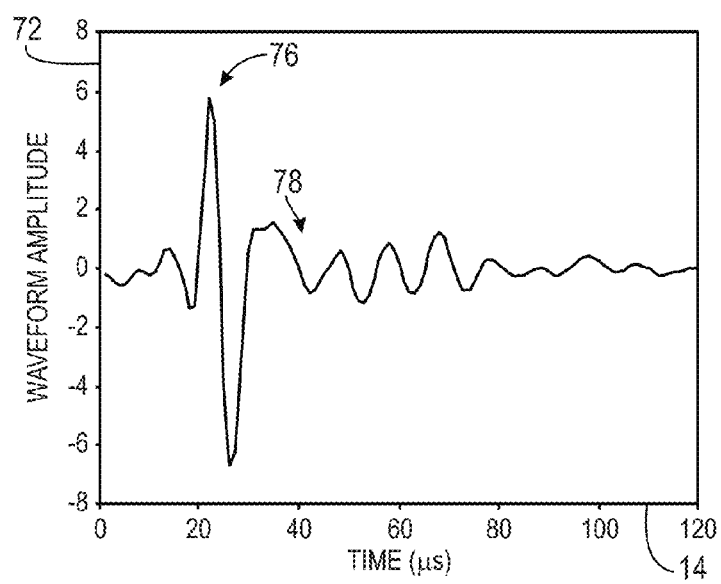
FIG. 4 is an example of an acoustic waveform obtained at a measure point by the acoustic downhole tool, in accordance with an embodiment.
Figure 7:
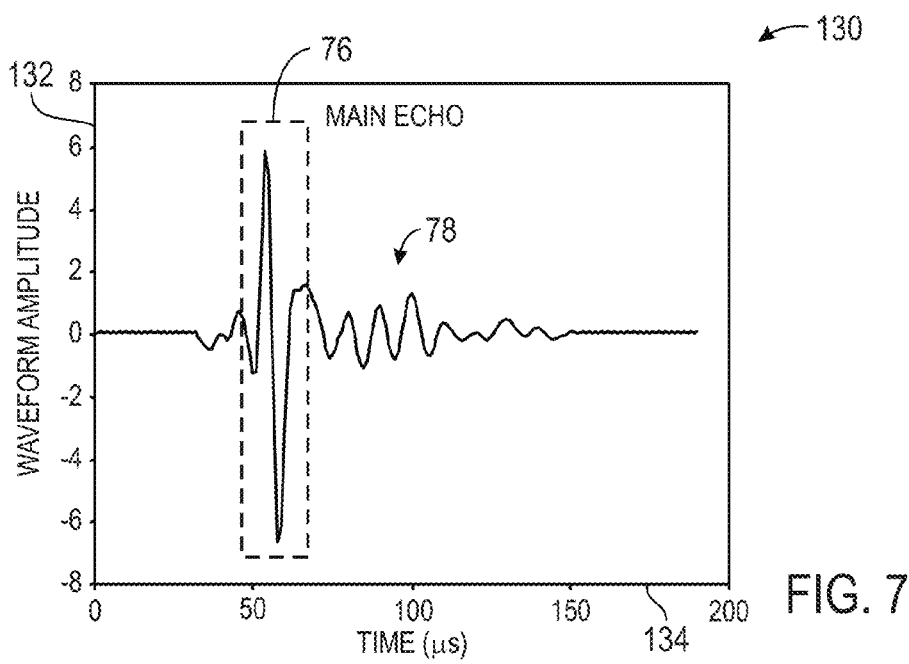
FIG. 7 is a plot illustrating an aspect of the waveform stacking in which a waveform is time-shifted based on its delay, in accordance with an embodiment.

Turning to FIGS. 7-10, which relate to applying the waveform stacking approach of FIG. 6 to a single waveform, a plot 130 of FIG. 7 represents the waveform of FIG. 4 after being offset as a function of its delay. As discussed above, when building the waveform matrix at block 116, waveforms may be offset as a function of delay to account for the different travel times associated with measurements obtained at different azimuths by the eccentered acoustic logging tool 26. In FIG. 7, an abscissa 132 represents waveform amplitude and an ordinate 134 represents time. As can be seen in FIG. 7, the main echo portion 76 of the waveform has been shifted in time from identified as occurring around 20 µs in FIG. 4 to occurring around 50 µs in FIG. 7. In reality, the offset applied in FIG. 7 is simply the inclusion of the original amount of waveform delay into the recorded waveform of FIG. 4. That is, as the waveforms are collected from various azimuths in the wellbore 16, the waveforms may be recorded (e.g., as in FIG. 4) without including the amount of time it took for the waveforms to become detected in relation to the initial acoustic pulse (though the waveform delay may be recorded as a separate parameter). Not including the delay in the recorded waveforms allows for a more direct comparison between waveforms for the purposes of cement evaluation. To identify coherent noise, however, the delay may be reintroduced into the waveform as in FIG. 7.

Figure 8:
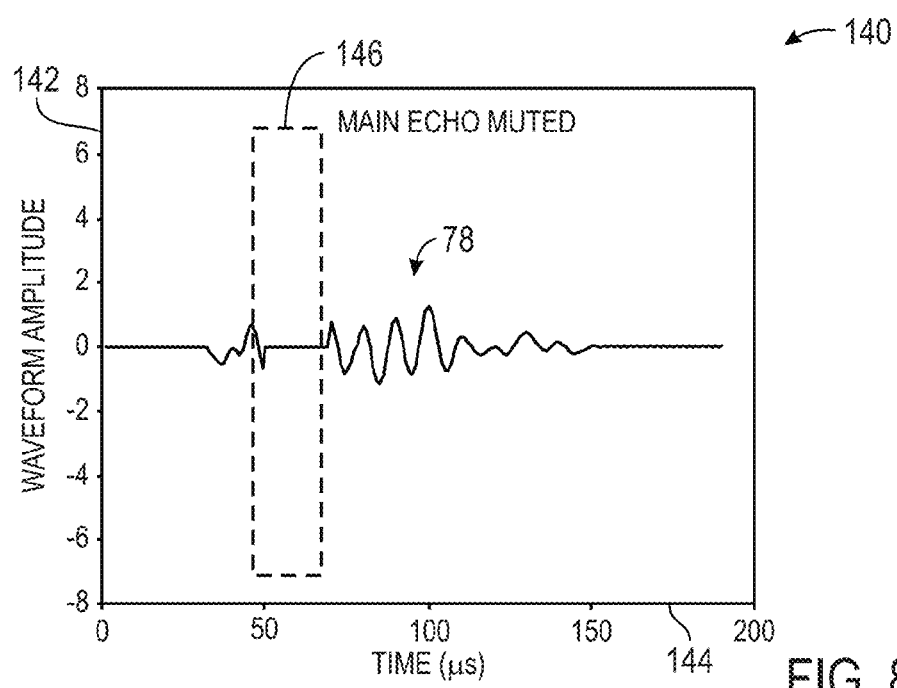
FIG. 8 is a plot illustrating an aspect of waveform stacking in which a main echo portion of the time-shifted waveform is muted, in accordance with an embodiment.

As noted above, before stacking the waveforms to isolate coherent noise, the data processing system 38 may also mute the main echo portion 76 of the waveforms. An example of muting the main echo portion 76 of the offset waveform of FIG. 7 is shown in a plot 140 of FIG. 8. In FIG. 8, an abscissa 142 represents waveform amplitude and an ordinate 144 represents time. The main echo portion 76 of the waveform may be identified using any suitable technique, including time filtering or amplitude analysis, to name just a few. As mentioned above, the data processing system 38 may offset and mute at least a subset of the acoustic cement evaluation data 36. These offset and muted waveforms may be understood to form the waveform matrix mentioned above. When the data processing system 38 offsets and mutes such a set of waveforms (e.g., over a 360° measurement cycle) in the manner shown in FIGS. 7 and 8, a mean of this set of offset and muted waveforms may be performed to obtain a stacked waveform (e.g., as described above with reference to blocks 114-118 of the flowchart 110 of FIG. 6). The stacked waveform may be understood to represent the coherent noise in the waveforms of the acoustic cement evaluation data 36.

Figure 9:
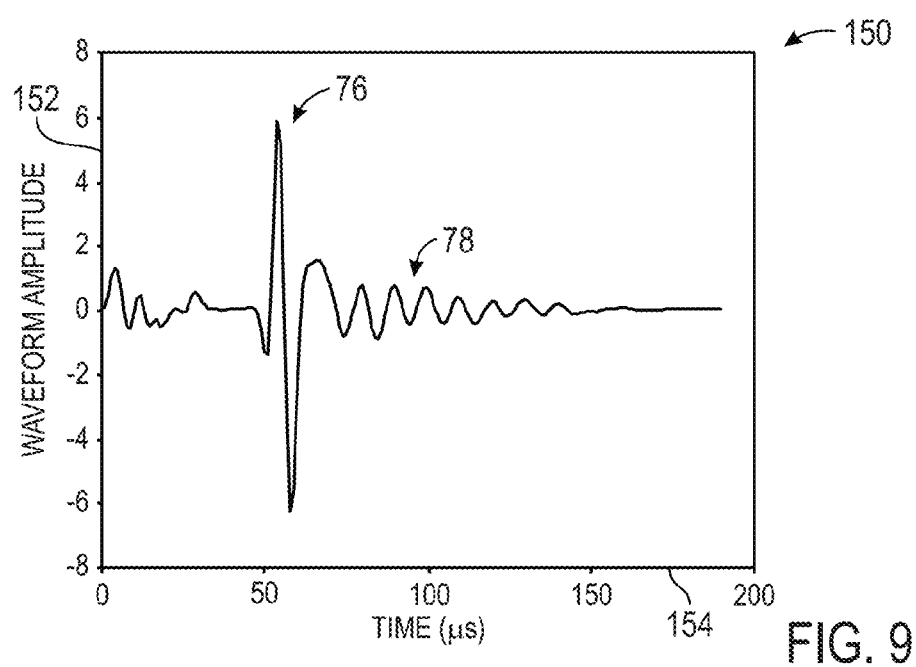
FIG. 9 is a plot of a time-shifted waveform after a stacked waveform representing coherent noise has been subtracted, in accordance with an embodiment.

As mentioned above, the data processing system 38 may subtract the stacked waveform from individual offset waveforms to obtain waveforms filtered of coherent noise. A plot 150 of FIG. 9 illustrates the waveform of FIG. 7 after the stacked waveform representing coherent noise has been removed. An abscissa 152 of FIG. 9 represents waveform amplitude and an ordinate 154 represents time. The waveform of FIG. 9 includes the main echo portion 76 and the reverberation portion 78, but it may be seen that the reverberation portion 78 has changed because coherent noise has been removed at certain points in time.

Figure 10:
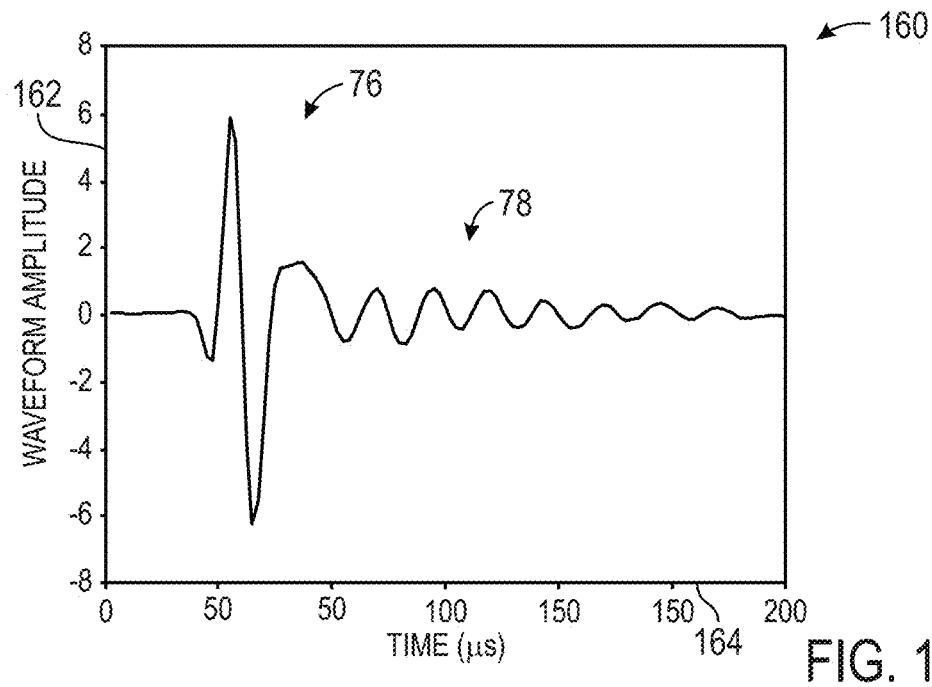
FIG. 10 is a plot illustrating a corrected waveform shifted back in time to its original starting point, in accordance with an embodiment.

When the offset is removed from the waveform of FIG. 9, a filtered waveform shown in a plot 160 of FIG. 10 may result. In FIG. 10, an abscissa 162 represents waveform amplitude and an ordinate 164 represents time. The waveform of FIG. 10 has been shifted back in time to its originally recorded position to enable acoustic cement evaluation processing using any suitable technique.

Figure 12:
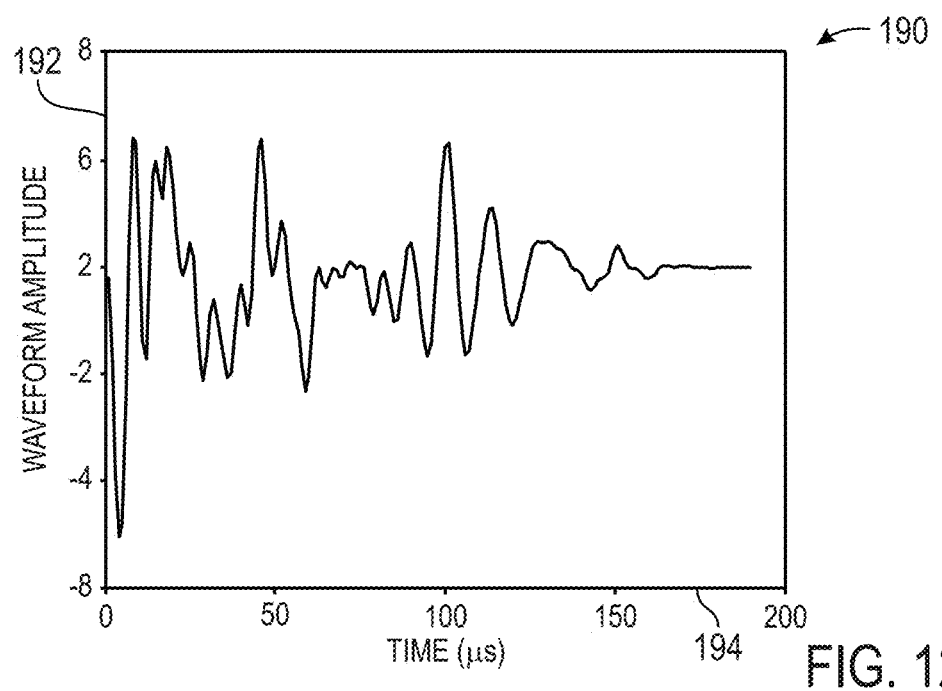
FIG. 12 is a plot of an example stacked waveform illustrating coherent noise in the various waveforms of FIG. 11, in accordance with an embodiment.
Figure 11:
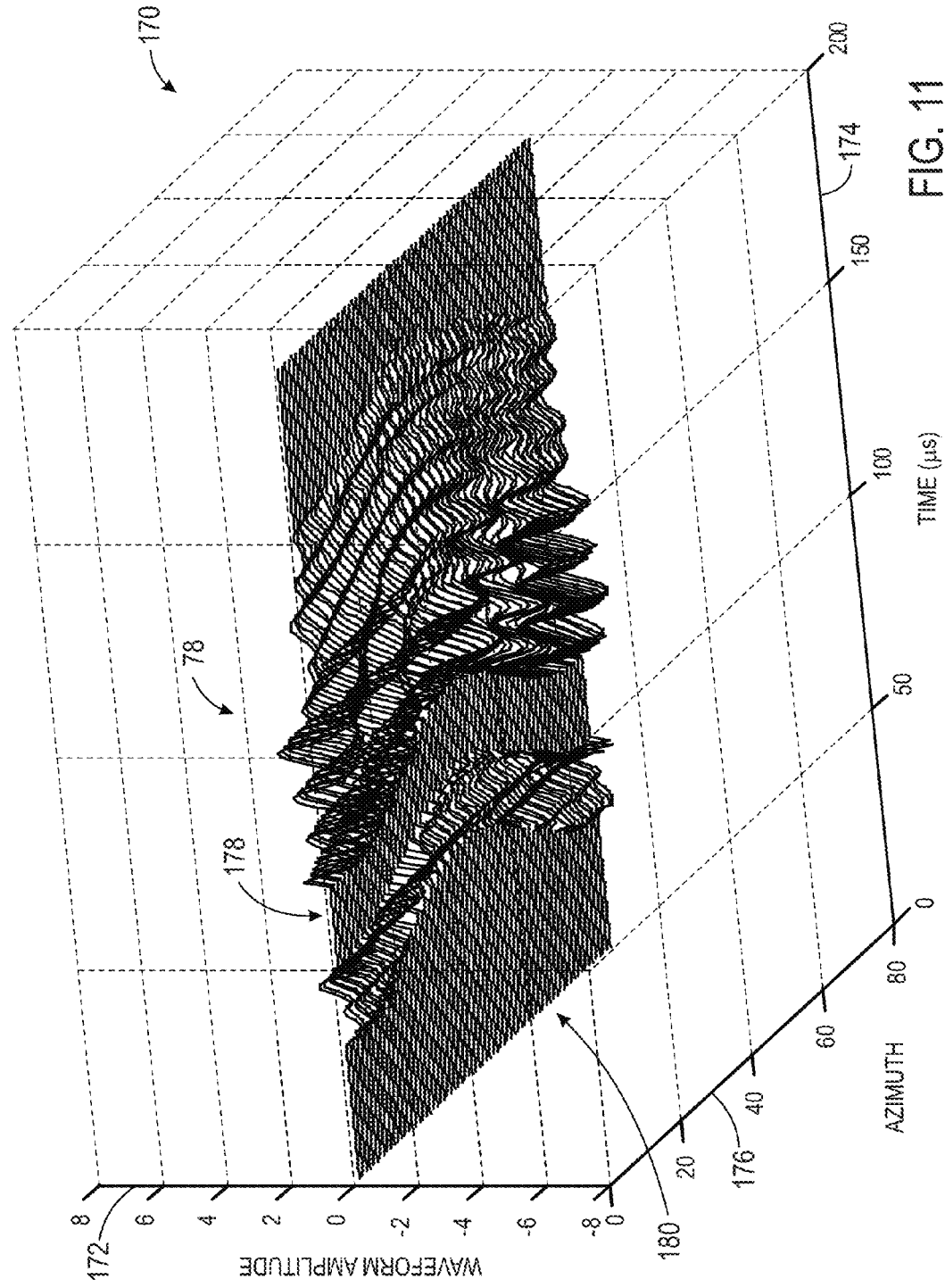
FIG. 11 is a three-dimensional plot of 72 waveforms obtained at various azimuths at a single depth in a wellbore after time-shifting the waveforms according to their respective delays and muting main echos of the waveforms, in accordance with an embodiment.
Figure 13:
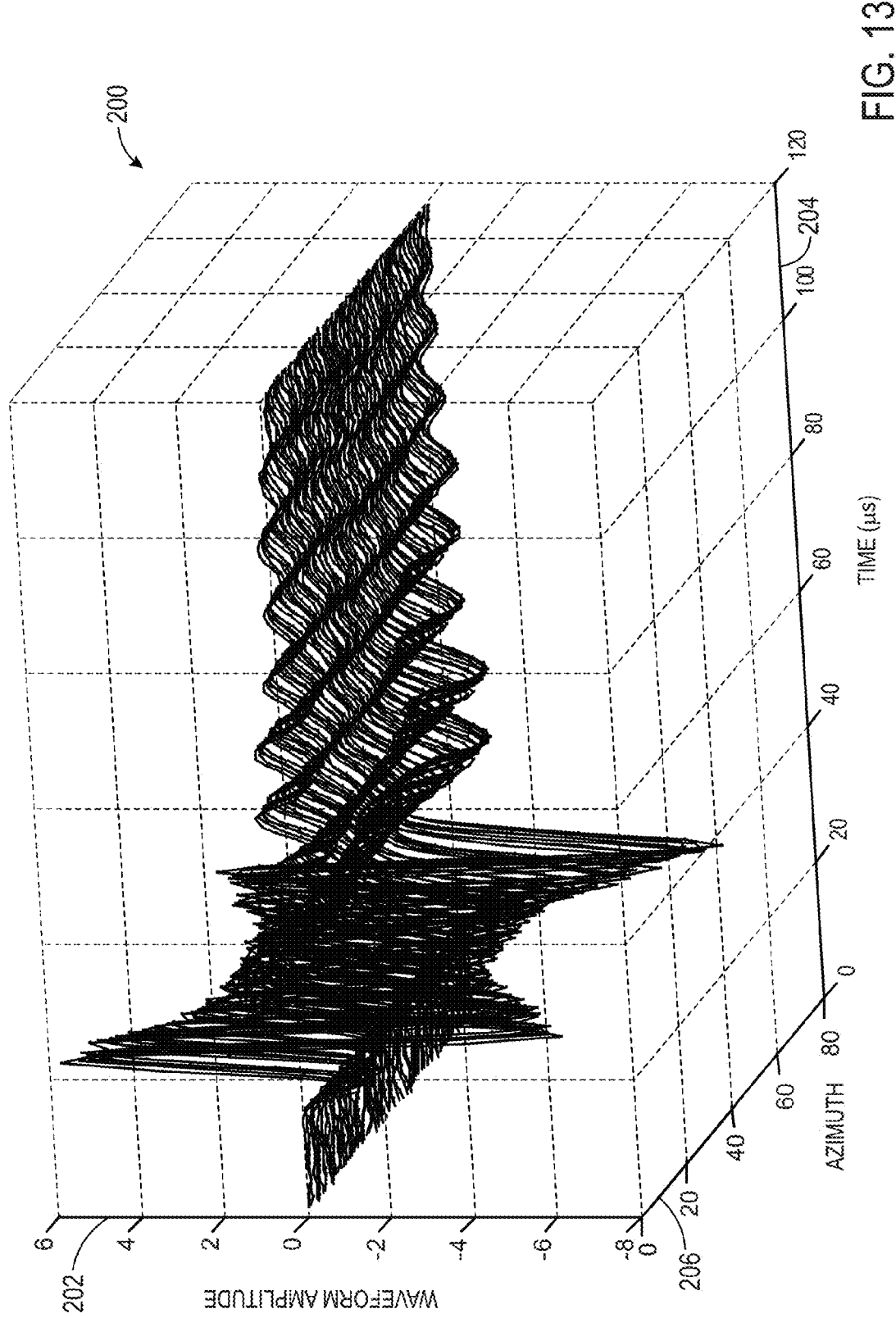
FIG. 13 is a three-dimensional plot of the waveforms of FIG. 11 after correction by subtracting the stacked waveform of FIG. 12 from each respective waveform of FIG. 11, in accordance with an embodiment.

FIGS. 11-13 illustrate the application of the waveform stacking technique of this disclosure to a set of 72 acoustic measurements obtained in a single 360° cycle at a single depth. In particular, FIG. 11 is a three-dimensional plot 170 of 72 waveform measurements obtained over 360° of azimuthal variation at one particular depth. A first axis 172 represents waveform amplitude, a second axis 174 represents time, and a third axis 176 represents the azimuthal angle within the wellbore 16 that the acoustic measurement was obtained. In FIG. 11, the individual waveforms have been muted, as seen at numeral 178, where the main echo portions 76 have been replaced with an amplitude value of 0. As seen at numeral 180, the waveforms have been offset in time according to their respective delays, which vary depending on the azimuthal angle of measurement. As noted above, the variations in delay are due to variations in travel times of the acoustic signals that occur because the acoustic logging tool 26 is eccentered in the wellbore 16.

By performing a mean over the set of waveforms shown in FIG. 11, a stacked waveform representing the coherent noise in the waveforms may be determined. A plot 190 of FIG. 12 represents one example of such a stacked waveform. The plot 190 includes an abscissa 192 that represents waveform amplitude and an ordinate 194 that represents time. The stacked waveform shown in FIG. 12 represents coherent noise found in the set of waveforms of FIG. 11.

As such, by subtracting the stacked waveform from each of the waveforms in the set of waveforms of FIG. 11, and subsequently removing the additional delay amounts applied to the respective waveforms, a set of filtered waveforms may be obtained as shown in a plot 200 of FIG. 13. In the example of FIG. 13, a first axis 202 represents waveform amplitude, a second axis 204 represents time, and a third axis 206 represents the azimuthal angle within the wellbore 16 that the acoustic measurement was obtained. The set of waveforms shown in FIG. 13 has a reduced amount of coherent noise owing to the subtraction of the stacked waveform. When the data processing system 38 processes the set of waveforms of FIG. 13 to determine cement quality, the resulting values may more accurately and/or more precisely correspond to the quality of the annular fill 18 (e.g., cement) installed behind the casing 22.

Figure 14:
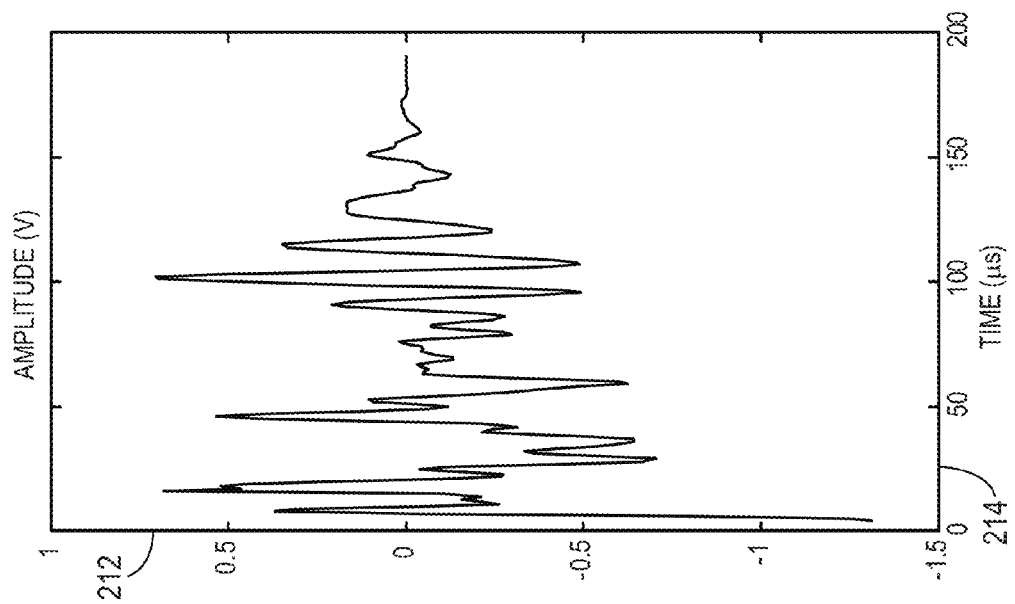
FIG. 14 is a plot of an example stacked waveform in the time domain obtained from a series of waveforms obtained at a variety of depths and azimuths, in accordance with an embodiment.

Although the examples above have shown waveform stacking performed in the time domain, at least some aspects of the waveform stacking described above may be performed in the frequency domain. Indeed, a plot 210 of FIG. 14 illustrates an example of a stacked waveform in the time domain. An ordinate 212 represents amplitude compared to an abscissa 214 that represents time in microseconds (μs). The same waveform may be represented in the frequency domain as illustrated by a plot 220 of FIG. 15. In the plot 220 of FIG. 15, an ordinate 222 represents a logarithmically scaled amplitude compared to an abscissa 224 that represents frequency in megahertz (MHz). The frequency-domain stacked waveform of FIG. 15 may be obtained by transforming the time-domain stacked waveform of FIG. 14 using any suitable transform (e.g., a Fast Fourier Transform (FFT)). To return the frequency-domain filtered waveforms to the time domain, if desired, an inverse transform may be applied (e.g., an Inverse Fast Fourier Transform (IFFT)).

Figure 16:
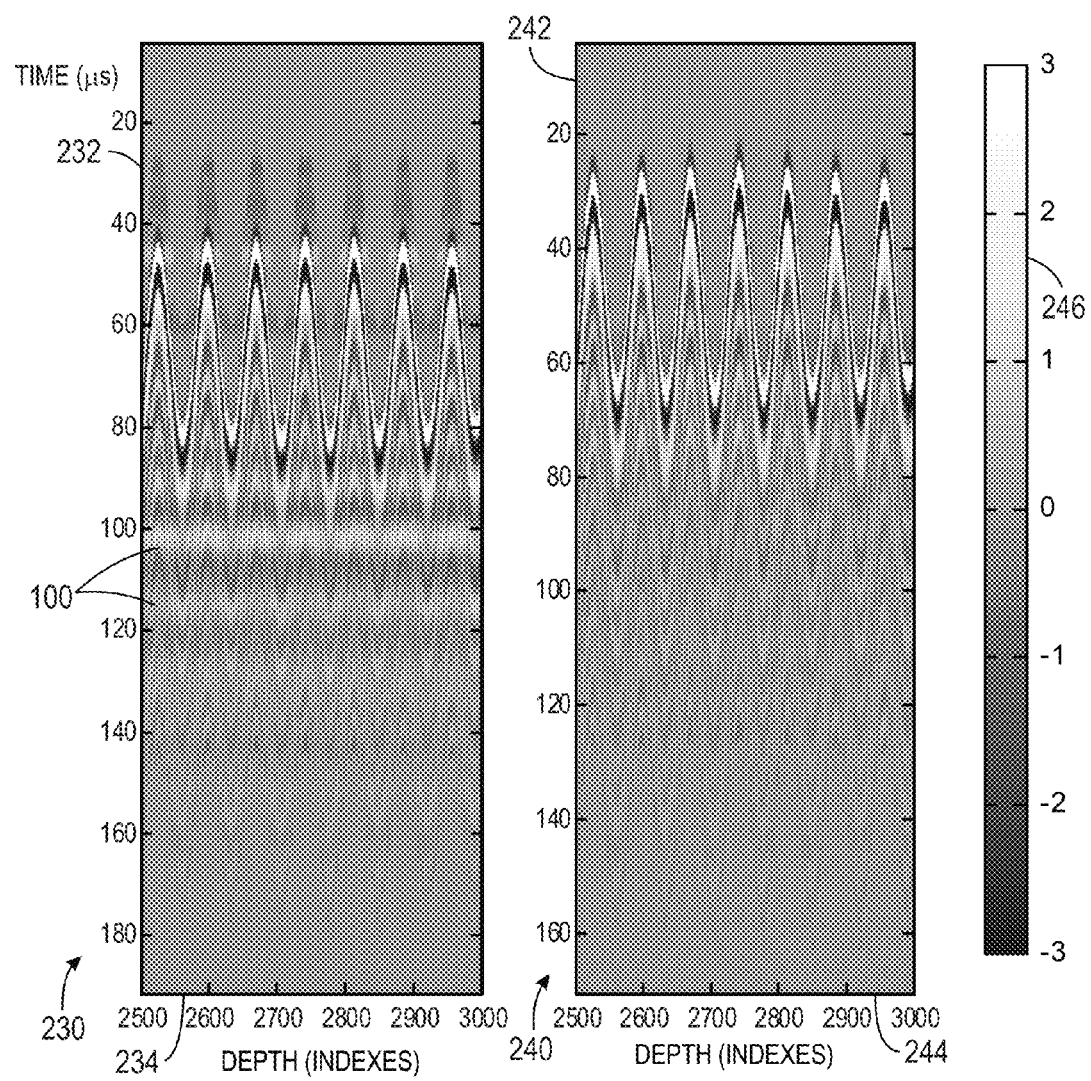
FIG. 16 is a comparison of two plots of waveforms obtained over a variety of depths and azimuths before and after removing coherent noise through waveform stacking, in accordance with an embodiment.
Figure 17:
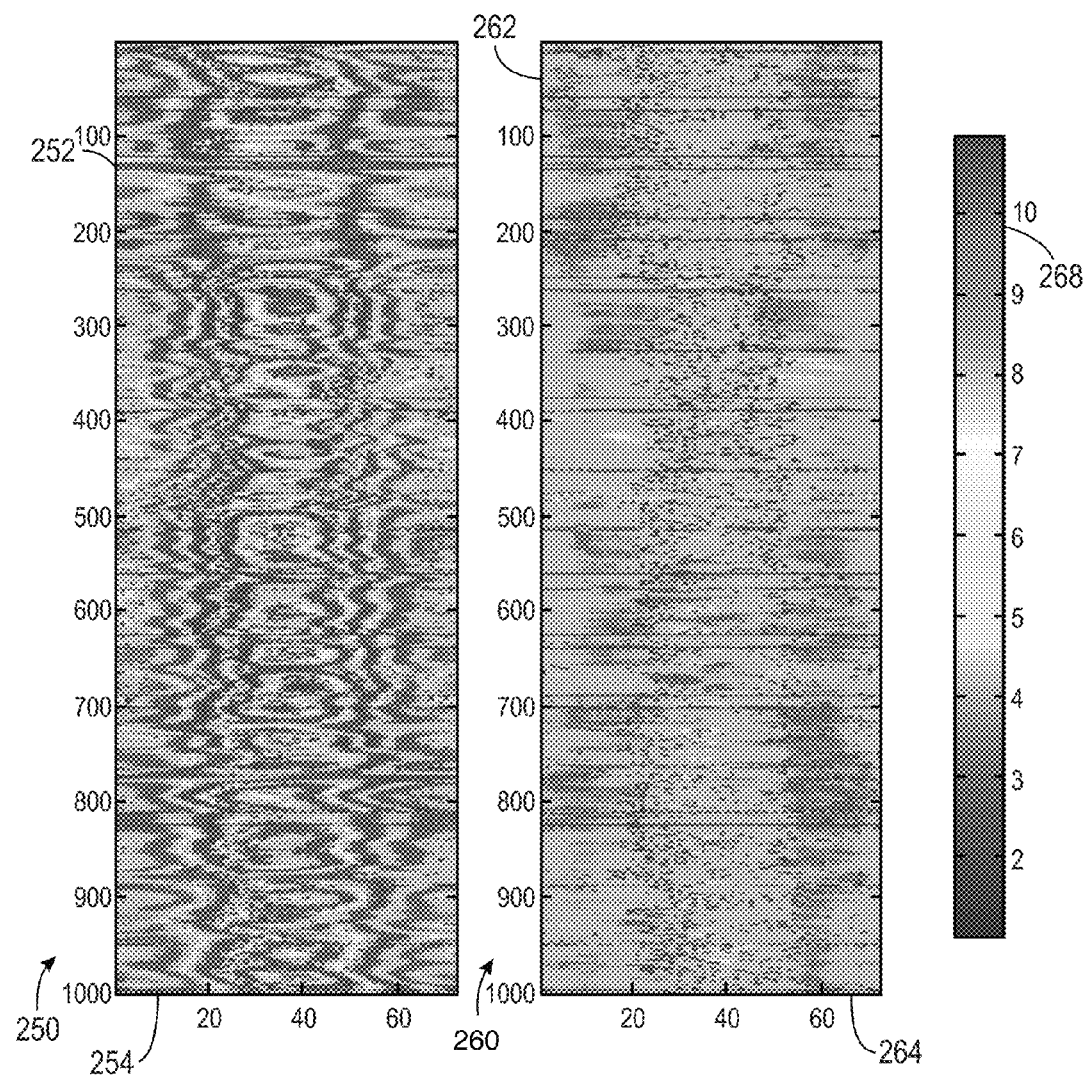
FIG. 17 is a comparison of acoustic logging results obtained using the uncorrected and corrected waveforms of FIG. 16, in accordance with an embodiment.

FIGS. 16 and 17 illustrate example results from using waveform stacking to remove coherent noise from waveforms of the acoustic cement evaluation data 36. FIG. 16 includes two plots: a first plot 230, which includes an ordinate 232 illustrating waveform amplitudes over time in microseconds (μs) and an abscissa 234 illustrating changes in depth and azimuth over a segment of a well; and a second plot 240, which correspondingly includes an ordinate 242 illustrating waveform amplitudes over time in microseconds (μs) and an abscissa 244 illustrating changes in depth and azimuth over the segment of the well. A legend 246 illustrates the relative amplitude of the acoustic waveforms (completely white representing a maximum amplitude and completely black representing a minimum amplitude).

The plot 230 of FIG. 16 illustrates pre-filtered waveforms that still include coherent noise 100. The plot 240 of FIG. 16, however, illustrates the resulting waveforms after performing waveform stacking as described above to remove the coherent noise 100. As apparent in the plot 240, when the waveforms of the acoustic cement evaluation data 36 have been filtered of the coherent noise 100, the resulting filtered acoustic cement evaluation data 36 may more clearly relate to the actual acoustic waveforms that have occurred in the wellbore 16.

This increased clarity may correspondingly improve the accuracy and/or precision of the calculated cement acoustic impedance, which may be presented in the form of well logs as shown in FIG. 17. Two logs are shown in FIG. 17: a first log 250, which includes an ordinate 252 representing well depth and an abscissa 254 representing the azimuth; and a second log 260, which correspondingly includes an ordinate 262 representing well depth and an abscissa 264 representing the azimuth. A legend 268 illustrates the relative magnitude of cement acoustic impedance throughout the well.

In FIG. 17, the first log 250 has been generated by computing estimates of acoustic impedance using the waveforms of the uncorrected acoustic cement evaluation data 36 of the plot 230 of FIG. 16. By contrast, the second log 260 of FIG. 17 has been generated by computing estimates of acoustic impedance using the filtered waveforms of the corrected acoustic cement evaluation data 36 of the plot 240 of FIG. 16. As apparent in FIG. 17, the second, corrected log 260 is correspondingly less noisy than the first, uncorrected log 250.

Figure 18:
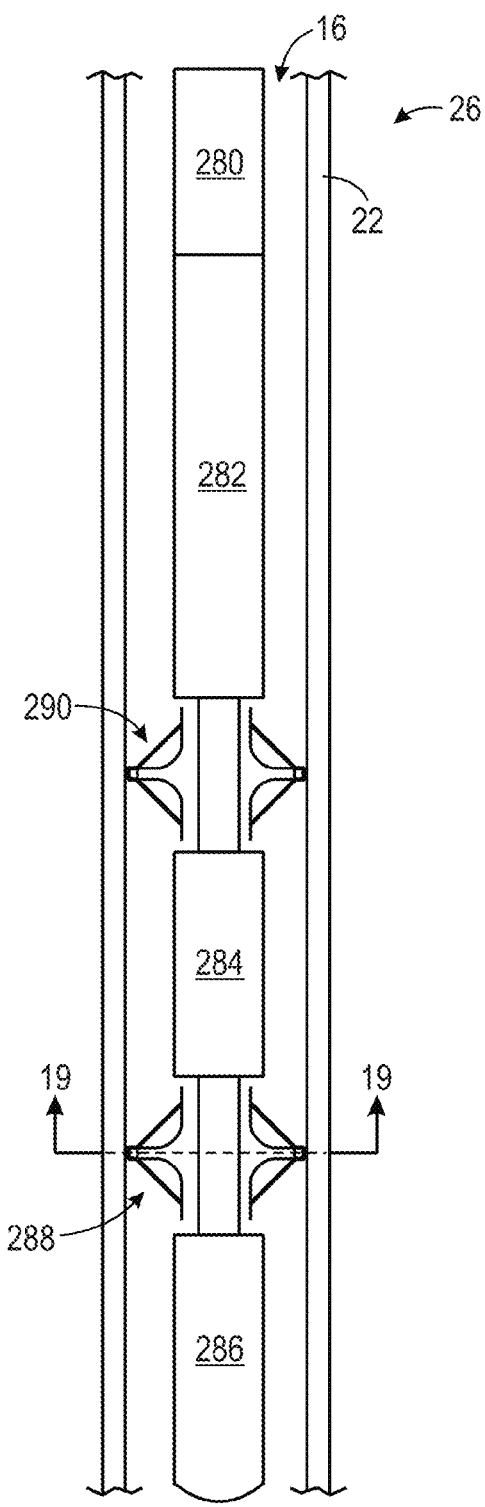
FIG. 18 is an example acoustic logging tool that will be purposely eccentered when placed in a well, in accordance with an embodiment.
Figure 19:
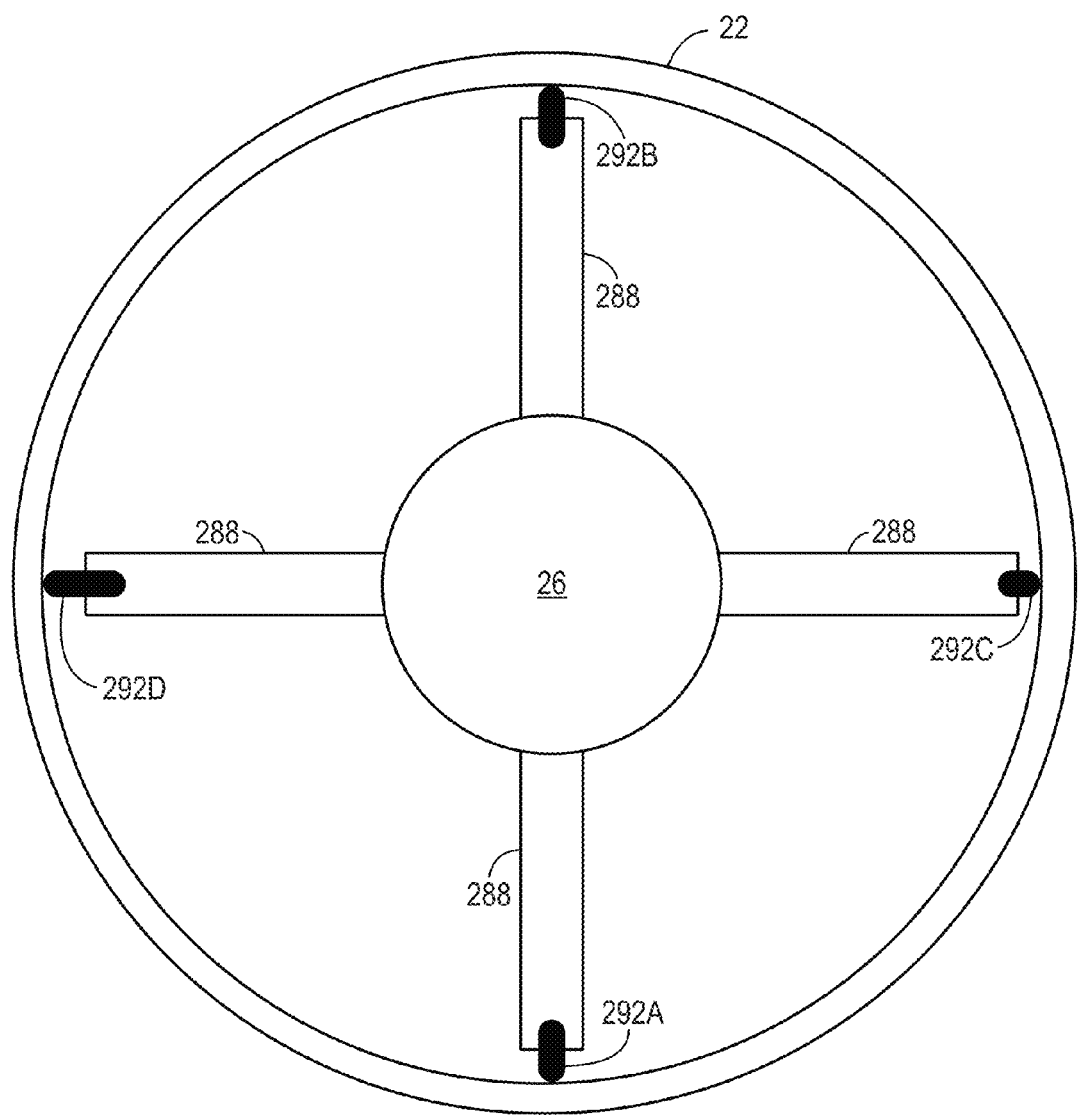
FIG. 19 is a cross-sectional view of the acoustic logging tool of FIG. 18 at cut lines 19-19.

As mentioned above, the waveform stacking of this disclosure may be used to remove coherent noise from any suitable data set obtained while the acoustic logging tool 26 is eccentered in the wellbore 16. The acoustic logging tool 26 may obtain this data while eccentered by chance or by design. FIGS. 18 and 19 provide one example of an acoustic logging tool 26 that is eccentered on purpose, thereby allowing the acoustic logging tool 26 to obtain acoustic cement evaluation data 36 that can be used to isolate coherent noise.

FIG. 18 illustrates a purposely eccentered acoustic logging tool 26 currently located in the wellbore 16 and surrounded by the casing 22. As shown, the acoustic logging tool 26 may include various tool segments 280, 282, 284, and/or 286 that may contain circuitry or other tools. The tool segment 286 may rotate to enable measurements at a variety of azimuthal angles. One or more in-line centralizers 288 and/or 290 may be used not to centralize the acoustic logging tool 26 in the wellbore 16, but rather to maintain an eccentered position in the wellbore 16. For instance, as shown in FIG. 19, which represents a cross-sectional view of FIG. 18 at cut lines 19-19, the centralizer 288 may cause the acoustic logging tool 26 to remain closer to some surfaces of the casing 22 than others. In the example of FIG. 19, the centralizer 288 uses differently sized wheels 292A, 292B, 292C, and 292D to eccenter the acoustic logging tool 26. In particular, the wheels 292A and 292B may be approximately the same size, while the wheel 292D may be larger than the wheel 292C. As a result, the acoustic logging tool 26 may be eccentered in the wellbore 16. The resulting waveforms obtained by the eccentered acoustic logging tool 26 may exhibit the cyclical delays described above, thereby enabling the coherent noise to be identified by waveform stacking and, accordingly, to be removed. Additionally or alternatively, other components of the centralizer 288 may vary in size to cause the acoustic logging tool 26 to become eccentered in the wellbore 16.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
   placing a downhole tool into a well to obtain a set of unfiltered well log data, wherein the set of unfiltered well log data comprises a plurality of individual measurements obtained at various azimuthal angles within the well, and wherein at least a subset of the set of unfiltered well log data comprises eccentered well log data obtained while the downhole tool is eccentered in the well, wherein the individual measurements of the eccentered well log data respectively include a waveform wherein the waveforms of each individual measurements have delays that vary as a function of the azimuthal angle at which they were obtained; and
   using a processor:
   identifying a common pattern occurring independently of delay in the waveforms of each individual measurement of the eccentered well log data, wherein the common pattern at least partially represents coherent noise of the eccentered well log data; and filtering the coherent noise of the downhole tool from the unfiltered well log data by subtracting the common pattern from the unfiltered well log data to obtain filtered well log data, wherein the filtered well log data is less noisy than the unfiltered well log data.

2. The method of claim 1, wherein the downhole tool comprises an acoustic downhole tool that obtains each of the plurality of individual measurements of the unfiltered well log data by:

emitting an acoustic output signal from a transducer toward a casing at an azimuthal angle of the well; and detecting a return acoustic waveform that occurs after the acoustic output signal interacts with the casing, wherein the return acoustic waveform has the delay that varies as the function of the azimuthal angle at which it was obtained and wherein the return acoustic waveform comprises a main echo portion and a reverberation portion.

3. The method of claim 2, wherein identifying the common pattern occurring independently of delay in the eccentered well log data comprises, using the processor:

building a waveform matrix that comprises a plurality of return acoustic waveforms of the eccentered well log data, wherein each of the return acoustic waveforms of the waveform matrix is offset in time by its respective delay;

muting the main echo portion of each of the return acoustic waveforms of the waveform matrix; and stacking the return acoustic waveforms of the waveform matrix to obtain a stacked waveform representative of the common pattern occurring independently of delay in the eccentered well log data.

4. The method of claim 3, wherein stacking the waveforms comprises performing a mean of the return acoustic waveforms of the waveform matrix.

5. The method of claim 3, wherein the coherent noise of the downhole tool is filtered from the unfiltered well log data by subtracting the stacked waveform from each return waveform of the unfiltered well log data.

6. The method of claim 1, wherein placing the downhole tool into the well comprises purposely eccentering the downhole tool in the well to cause the plurality of individual measurements of the eccentered well log data to have respective delays that vary as a function of the azimuthal angle.

7. The method of claim 6, wherein the downhole tool comprises an acoustic downhole tool and is purposely eccentered in the well by an eccentering distance ecc according to the following relationships:

dt>T, where T represents a period of casing resonance and dt represents a difference between a maximum delay and a minimum delay of the eccentered well log data;

$$dt = 4 * \frac{ecc}{Vmud},$$

where ecc represents an eccentering distance and Vmud represents an acoustic velocity in the well fluid; and $$T \approx 2 * \frac{C_t}{Vsteel},$$

where $c_t$ represents a thickness of the casing and $V_{steel}$ represents acoustic velocity in steel, wherein the casing comprises steel.

8. The method of claim 1, comprising, using the processor, identifying the eccentered well log data from among the unfiltered well log data by identifying cyclical changes in the delays of the measurements having a ratio greater than one of a difference between maximum delay and minimum delay compared to a period of casing resonance.

9. A non-transitory, computer-readable medium comprising instructions executable by a processor to:

receive well log data that comprises a plurality of acoustic waveforms obtained at various azimuthal angles by an acoustic downhole tool, wherein a first subset of the well log data comprises acoustic waveform delay characteristics indicative of having been obtained while the downhole tool was eccentered in the well;

identify a common pattern in at least a second subset within the first subset of the well log data, wherein the common pattern is substantially independent of delays of the acoustic waveforms of the second subset; and subtract the common pattern from at least one of the plurality of acoustic waveforms of the well log data to obtain a filtered acoustic waveform that has less coherent noise.

10. The computer-readable medium of claim 9, wherein the second subset of the well log data comprises a fixed window of the well log data.

11. The computer-readable medium of claim 9, wherein the second subset of the well log data comprises substantially all of the acoustic waveforms obtained over one or more whole 360° cycles of azimuthal angle measurements.

12. The computer-readable medium of claim 9, wherein the second subset of the well log data comprises a sliding window of the well log data surrounding the at least one of the plurality of acoustic waveforms from which the common pattern is subtracted.

13. The computer-readable medium of claim 9, wherein the instructions to identify the common pattern comprises instructions to:

build a waveform matrix that comprises the plurality of acoustic waveforms of the second subset, wherein each of the return acoustic waveforms of the waveform matrix is offset in time by its respective delay;

mute a main echo portion of each of the acoustic waveforms of the waveform matrix; and stack the acoustic waveforms of the waveform matrix to obtain a stacked waveform representative of the common pattern that is substantially independent of the delays of the acoustic waveforms of the second subset.

14. The computer-readable medium of claim 9, wherein the instructions comprise instructions to identify the second subset of the well log data by identifying cyclical changes in the delays of the measurements having a ratio greater than one of a difference between a maximum delay and a minimum delay compared to a period of casing resonance.

15. The computer-readable medium of claim 9, wherein the common pattern is identified in the time domain and subtracted from the at least one of the plurality of acoustic waveforms in the time domain.

16. A downhole tool comprising:

a rotating measurement component configured to rotate to obtain measurements at a plurality of azimuthal angles in a well; and a centralizer configured to eccenter rather than center the downhole tool in the well while the rotating measurement component rotates to obtain the measurements at the plurality of azimuthal angles.

17. The downhole tool of claim 16, wherein the rotating measurement component comprises one or more acoustic transducers collectively configured to emit an acoustic signal at each of the plurality of azimuthal angles in the well and detect acoustic return waveforms that result when the emitted acoustic tool measurements interact with casing of the well, wherein the acoustic return waveforms represent the measurements obtained at the plurality of azimuthal angles.

18. The downhole tool of claim 17, wherein the acoustic signal comprises an ultrasonic pulse.

19. The downhole tool of claim 16, wherein the rotating measurement component is configured to obtain measurements with respective delays that vary as a function of azimuthal angle.

20. The downhole tool of claim 16, wherein the centralizer comprises at least two wheels configured to contact the casing, wherein the two wheels are of different sizes.

\* \* \* \* \*